United States Patent [19]

Serebryakov et al.

[11] Patent Number: 5,537,451
[45] Date of Patent: Jul. 16, 1996

[54] METHOD AND APPARATUS FOR DETECTING TRACE ELEMENTS IN A SUBSTANCE THROUGH X-RAY FLUORESCENCE

[75] Inventors: Alexander S. Serebryakov; Oleg Y. Shirokoborod; Eugenne V. Blyakher, all of St. Petersburgh, Russian Federation

[73] Assignee: Otto Pohl, Lancing, N.Y.

[21] Appl. No.: 452,408

[22] Filed: May 26, 1995

[51] Int. Cl.[6] ................................................ G01T 1/36
[52] U.S. Cl. .................................... 378/45; 378/44
[58] Field of Search ................................. 378/44–49

[56] References Cited

U.S. PATENT DOCUMENTS

| | | |
|---|---|---|
| 3,072,789 | 1/1963 | Ladell et al. . |
| 4,256,961 | 3/1981 | Shoji et al. . |
| 4,847,882 | 7/1989 | Knoth et al. . |
| 5,148,457 | 9/1992 | Kubota et al. . |
| 5,220,591 | 6/1993 | Ohsugi et al. . |

*Primary Examiner*—Craig E. Church
*Attorney, Agent, or Firm*—Jones, Tullar & Cooper

[57] ABSTRACT

A method and apparatus for trace element analysis of substances by using total reflection of an X-ray excitation beam which creates fluorescence in a sample of the substance is disclosed. A thin sample is located on a reflecting surface on sample support and is irradiated with X-ray radiation from an X-ray source at a grazing angle of incidence. The angle of incidence is less than the critical angle of the total reflection. A detector is positioned above the sample to capture the fluorescent yield radiation signal emitted from the sample and spectral analysis of that yield signal is used to identify trace elements in the sample. With the present invention, the background level due to radiation scattered from the sample support is extremely small, sensitivity is enhanced by several orders of magnitude. In accordance with the present invention, total reflection conditions are provided with an X-ray waveguide. An important feature of invention is that the complicated and expensive machinery for precise adjustment of the probes and reflecting surfaces which ensures multiple total reflection in the prior art systems is not needed. The present invention can be used as part of a universal EDXF-TR analyzer capable of operating both in a total reflection and a traditional X-ray schemes.

20 Claims, 9 Drawing Sheets

METHOD AND APPARATUS FOR DETECTING TRACE ELEMENTS IN A SUBSTANCE THROUGH X-RAY FLUORESCENCE

BACKGROUND OF THE INVENTION

The present invention pertains, in general, to instruments for analyzing matter to detect trace elements by X-ray fluorescence.

The X-ray fluorescence analysis of matter can be accomplished by using total reflection of the X-ray. A thin sample is located on a reflecting surface upon a sample support and is irradiated with the X-ray radiation at a grazing angle of incidence which is less than the critical angle of total reflection. With this arrangement, the depth of penetration for X-rays in the sample is extremely small and the resulting yield of radiation emitted from the sample in useful signal due to this is correspondingly small. A detector is usually positioned above the sample to permit spectral analysis of fluorescent radiation emitted from the sample. This fluorescent radiation is the useful signal which permits identification of trace elements within the sample.

Devices for conducting Energy Dispersive X-ray Fluorescence analysis (EDXF) of the contents of samples or probes with trace amounts of substances to be analyzed are well known in the art. Such analyzers may excite fluorescence of the substance using the known Total External Reflection (TR) method, wherein the excitation X-ray beam falls on the probe at an angle less than the critical angle. EDXF-TR equipment usually is constructed with the layout illustrated in FIG. 1, wherein an analyzer 10 may include an X-ray tube 11, a set of diaphragm-collimators 12, a TR reflector 13, a reflector and probe holder 14, a probe 15 and a detector 16. Probe and sample are used interchangeably as terms of art in this field.

Figure 1:
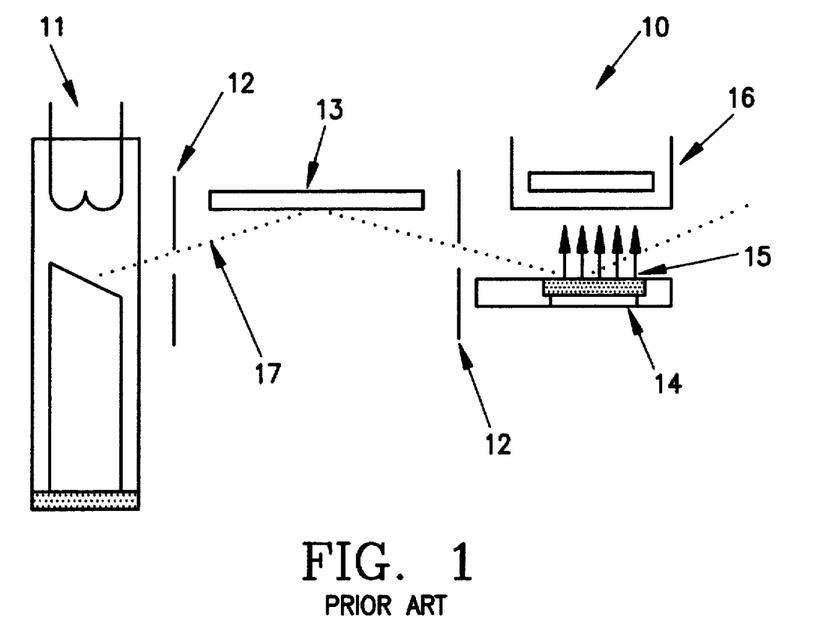
FIG. 1 illustrates a front view of an arrangement for an EDXF-TR analyzer which is typical of the prior art.

Excitation radiation 17 from the X-ray tube 11 is directed through diaphragm-collimators 12 at an angle of a few arc minutes to the surface of the first TR reflector 13 which acts as a low-pass energy filter (or cut-off filter). This reflector may, in one form, be a multilayer X-ray mirror. The diaphragm-collimators 12 are used for preliminary selection of the angle distribution of the tube's incident excitation beam (for the selection of the needed incidence angles of the beam) and for protecting the probe and the detector from being reached by a direct unreflected X-ray stream. The incident X-ray excitation beam reflects from reflector surface 13 and then propagates to the probe 15, positioned on the surface of TR reflector—probe holder 14, at an angle below the critical angle of total reflection of the reflector 14.

With this arrangement, penetration of X-rays into the holder 14 and energy transfer to it are extremely small. Due to this small amount of energy transfer to the probe, the intensity of scattered fluorescence radiation from the sample is extremely small, in these prior art devices.

Fluorescence radiation 18 from the sample 15 due to the impingement of excitation radiation beam 17 is collected with a detector 16, which is usually an energy-dispersive semiconducting detector with high energy resolution. Reflectors 13 and 14 are usually made of glass or quartz plates, optically polished to achieve a surface micro roughness of, at most, 0.05µ, and having a macro roughness (deviations from a perfect plane) of at most a few microns. A small amount of the substance being analyzed is put onto the reflector probe holder (14) and dried. Analysis is then performed upon the thin remaining layer, using methods such as that shown in U.S. Pat. No. 4,426,717.

Figure 2:
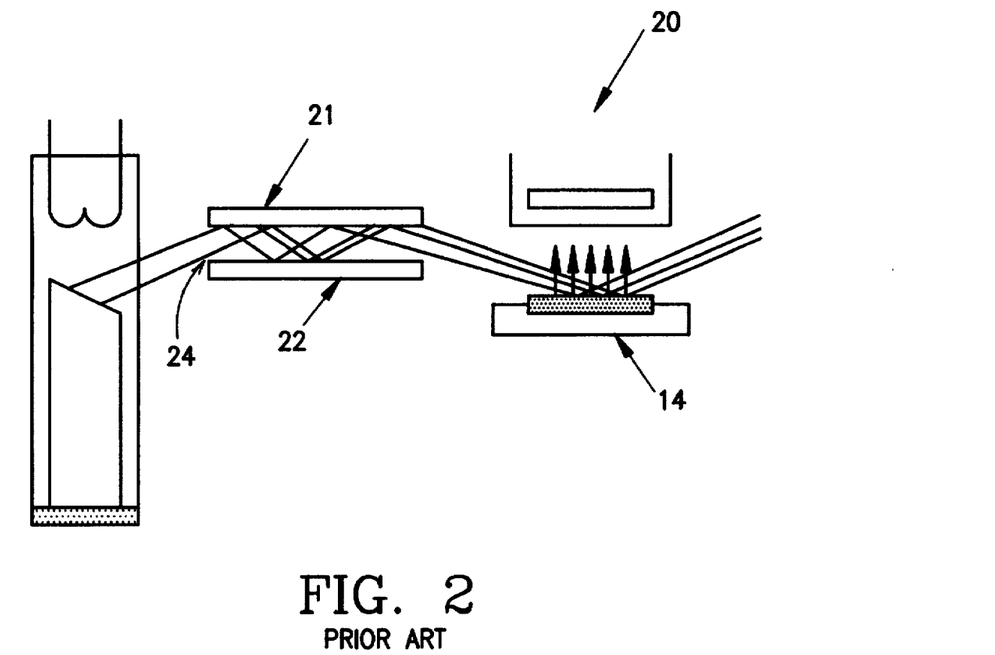
FIG. 2 illustrates a front view of an arrangement for an EDXF-TR analyzer with forming of an incident beam, also typical of the prior art.

FIG. 2 illustrates another configuration for an analyzer 20, wherein two polished, planar, parallel reflector plates 21 and 22 form an X-ray collimator-waveguide with a slit 24 between them for directing radiation to the probe holder 14.

The guiding principle illustrated in FIG. 1 and FIG. 2 is that the incident excitation X-ray radiation must be controlled using carefully positioned reflectors.

The EDXF TR analyzers of the prior art allow one to determine the composition of trace elements in probes with extremely low relative detection limits (0.0000001–0.00000001% for various elements). However, these analyzers have three disadvantages:

First, due to the very small range of possible critical angles of TR incident exciting radiation, the relative positions (distances and angles) of the diaphragm collimators, reflectors and probe holder must be controlled with a very high level of precision. Such precision position control is accomplished through the use of very complicated mechanical and electronic devices, such as goniometers or the like, which can be very expensive.

Second, the geometry of such analyzers, as outlined above, precludes use of the analyzer for the EDXF analysis of bulk samples by the traditional method, in which the axis of symmetry for the detector and X-ray tube are mutually perpendicular and are directed at an angle of 45° to the sample surface. Because of the requirements for high precision, as noted above, a reflector cannot be used for analysis of more than one probe at a time, thus increasing the cost of analysis.

Finally, with the prior art analyzers, X-ray tube efficiency is very low. Tube efficiency is defined as energy into the probe as a function of energy emitted by the tube. The poor efficiency of prior art systems is a result of two factors. First, the incident radiation which propagates as a spherical wave decreases in inverse proportion to the free-space distance squared (regardless of segment length), so that high power, high voltage generators and high power, high voltage X-ray tubes must be used in the prior art systems to attain the desired results. Second, the area of the focus spot is proportional to power from the tube, because the brightness of every point of an X-ray tube is nearly independent of power. In the prior art systems, the preliminary collimation of the X-ray tube's incident excitation beam typically restricts most of the X-ray focus spot, thus reducing tube efficiency.

SUMMARY OF THE INVENTION

It is an object of the present invention to create an EDXF-TR analyzer which does not require precision in sample positioning and thus does not require the use of complicated and expensive mechanical and electrical positioning devices.

It is also an object of the present invention to allow placement of several probes on one reflector plate of an EDXF-TR Analyzer.

It is another object of the present invention to provide an EDXF-TR analyzer which permits the use of low power and medium power X-ray tubes.

It is also an object of the present invention to create a universal EDXF-TR analyzer capable of operating both in TR and traditional X-ray modes.

These objects are achieved, in accordance with the present invention, through the provision of an EXDF analyzer utilizing an X-ray waveguide which achieves a direct transfer of the entire energy output of an X-ray beam from an entrance to the waveguide to its exit. This transfer occurs only by multiple total reflection and without the losses which are typical for a spherical wave. With the waveguide of the present invention, all the energy losses are due to reflection coefficients which are less than 1. This waveguide is a continuous heterogeneous media bounded in the space and includes, for its entire length, domains with chosen refraction coefficients. The domains with the highest refraction coefficient are reflecting walls, which form the shell of the waveguide, while the domains with the lowest refraction coefficient are channels for propagation of X-rays. The reflecting walls are formed through the whole length of the waveguide to provide the required total reflection condition at any point along the channel. The channels may be formed as cavities or slits and may be in the shape of prisms, cylinders, cones, or the like.

In the present invention, the X-ray waveguide is used for creation of Total Reflection (TR) and channeling of energy from an X-ray source to a probe, or sample, with a probe holder being integrated into the waveguide to form a unitary structure. All reflecting surfaces of the waveguide are made to behave as low-pass energy filters in the formation of the TR excitation beam and the waveguide simultaneously serves as a probe holder.

The main difference from the above-mentioned prior art is that several probes are placed on reflecting surfaces, inside the waveguide, in the area reached by the excitation radiation after multiple total reflection.

The structure of the waveguide also ensures the passage of the probe's fluorescent radiation from the sample to the detector. The detector is advantageously positioned to receive the fluorescent radiation from the sample and to attenuate reception of the excitation X-ray radiation which has propagated through the waveguide.

BRIEF DESCRIPTION OF THE DRAWINGS

The foregoing and additional objects, features and advantages of the invention will become apparent to those of skill in the art from the following detailed description of preferred embodiments, thereof taken with the accompanying drawings, in which:

FIG. 3b illustrates a front elevation view of the embodiment of FIG. 3a;

FIG. 3c illustrates a top plan view of the embodiment of FIG. 3a;

DETAILED DESCRIPTION

The prior art systems illustrated in FIG. 1 and FIG. 2 are conventional systems for EDXF-TR, both of which include the drawbacks described above.

The invention will be described in greater detail below and with the reference to the embodiments illustrated in FIGS. 3a to 9. All of the drawings are schematic, are not to scale and are for purposes of illustrating the features of the invention.

Figure 3A:
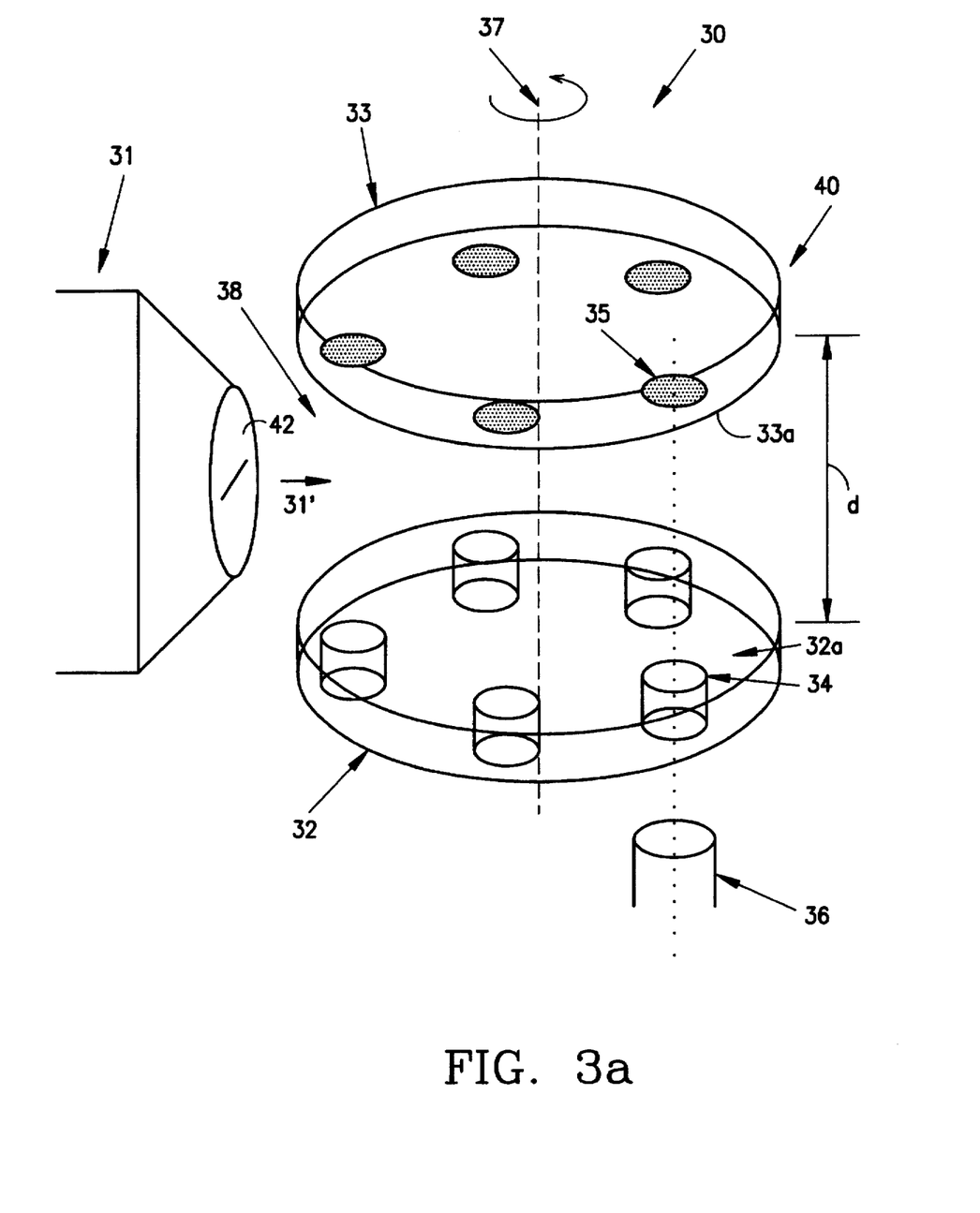
FIG. 3a illustrates in diagrammatic form a perspective view of a first embodiment of the present invention where the waveguide comprises two parallel plane reflectors.
Figure 3B:
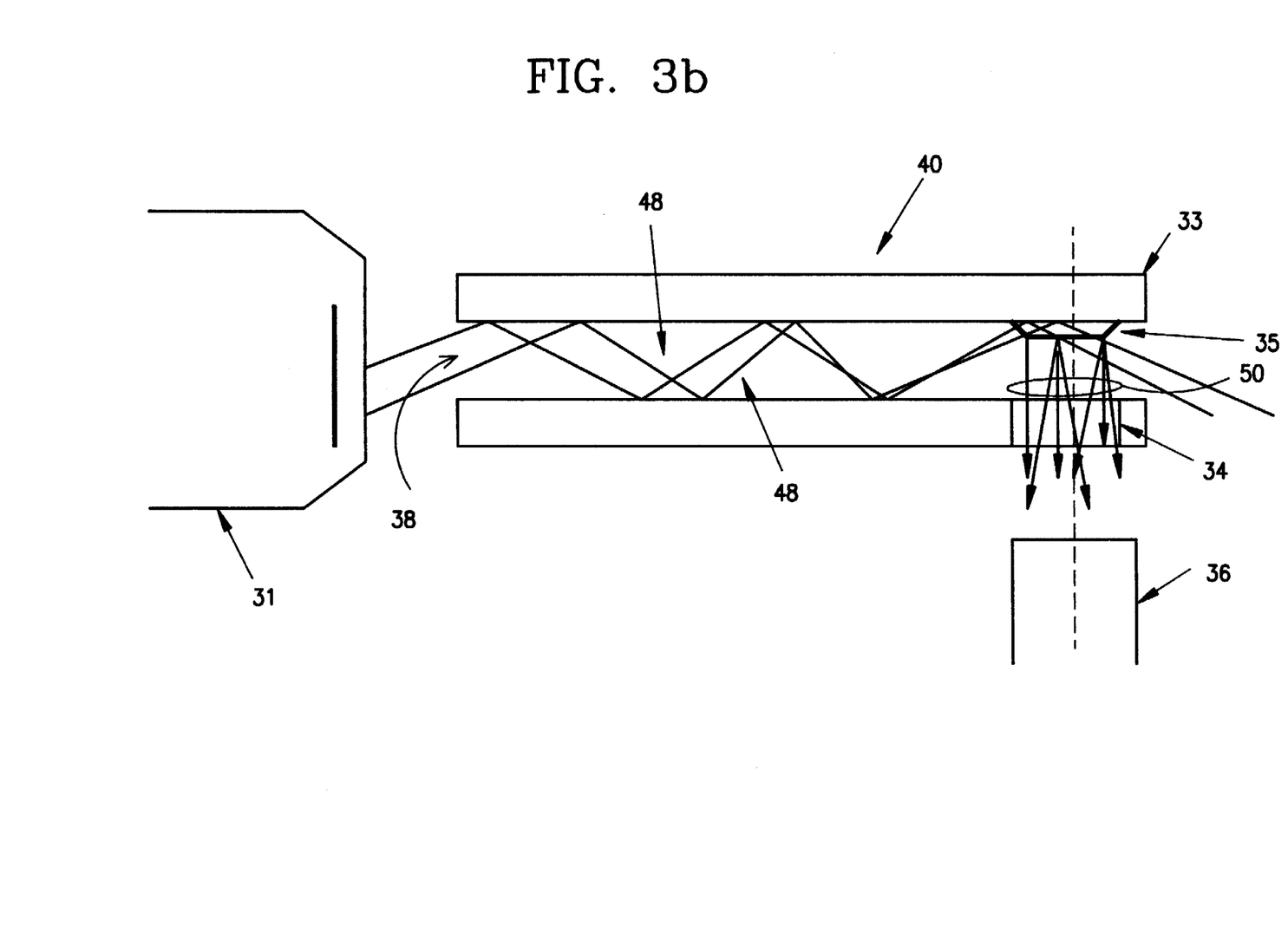
Figure 3C:
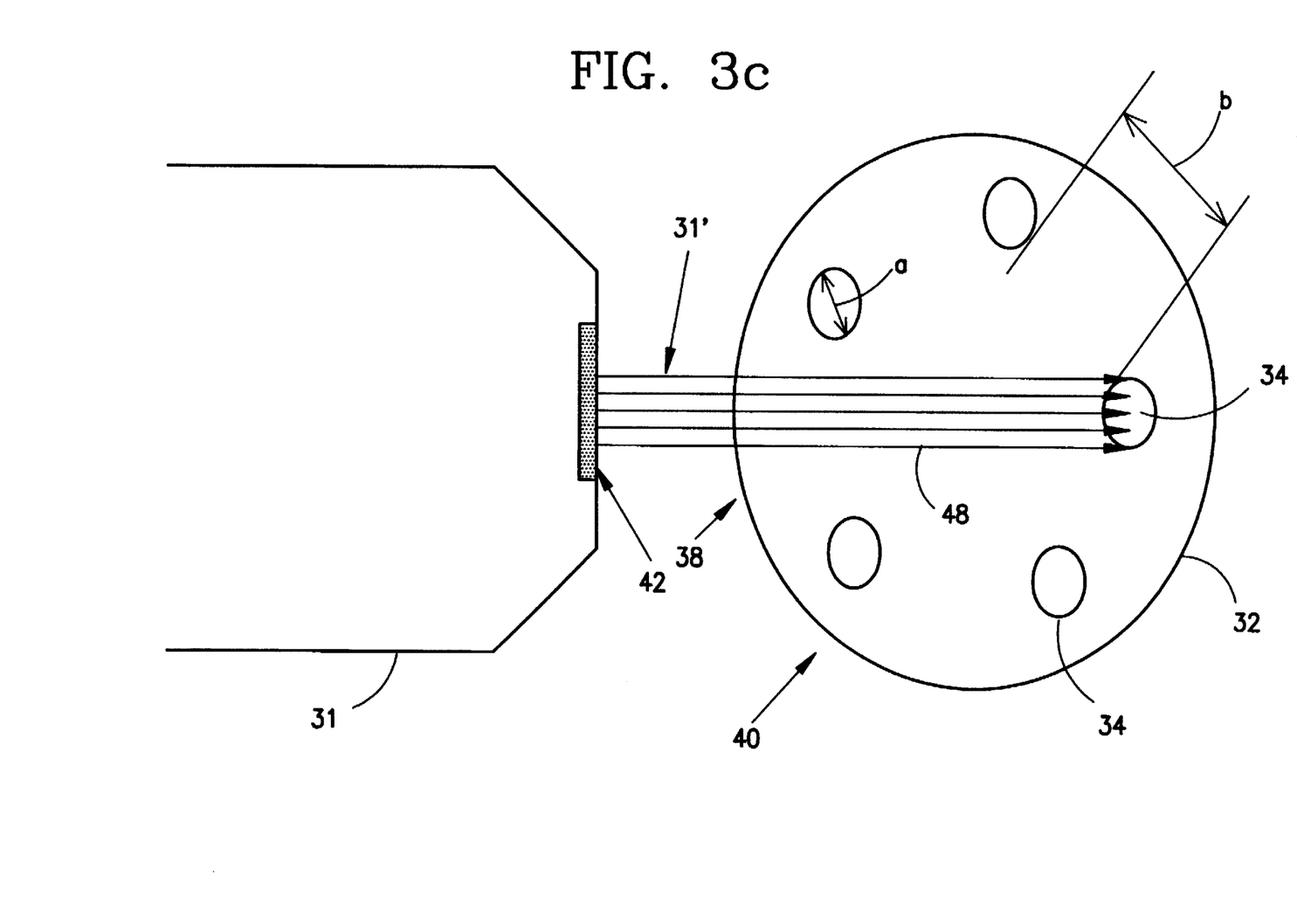

Turning now to FIGS. 3a, 3b and 3c, the essential parts of a first embodiment of a TR analyzer 30 are illustrated. An X-ray source 31 provides an excitation signal 31' in the form of a stream of X-rays which are directed into and through a waveguide consisting of a bottom planar reflector 32 and a top planar reflector 33 which are parallel to and spaced apart from one another by a distance d. The reflectors 32 and 33 are arranged very closely to each other and have respective polished surfaces 32a, 33a which face each other and are parallel. In FIG. 3a, the reflectors 32, 33 illustrated are optically transparent.

Bottom planar reflector 32 includes at least one aperture 34 which extends through the reflector, while the top reflector 33 carries a sample 35. The aperture 34 is sized to match the size of sample 35, while samples 35 is affixed to polished surface 33a and is positioned over aperture 34. A detector 36 is positioned outside the waveguide adjacent reflector 32, is aligned with aperture 34, and is opposite sample 35 to receive fluorescent radiation from the sample through aperture 34. This detector position serves to attenuate reception at the detector of the excitation X-ray radiation 31' which propagates through the waveguide.

Detector 36 includes fluoroscopic radiation sensor and a system for data acquisition and processing. Detector 36 is a sensor system which can detect a spectrum of fluoroscopic radiation, and usually includes an energy-dispersive semi-conducting detector with high energy resolution.

Top reflector 33 and bottom reflector 32 may be circular and rotatable about an axis 37 in a carousel arrangement to allow a plurality of samples to be processed. The diameter, a, of each aperture 34 should not exceed the diameter of the detector's entrance window (to attain the maximum aperture). To achieve the simplest possible construction of the reflector plates 32, 33, they should have an odd number of holes 34, placed in a circle with equal distances, b, between them. The diameter of the circle in which the holes are arranged should be such that the distances, b, between the holes are a little larger than the diameter a of the holes. The top reflector 33 and the bottom reflector 32 are spaced apart to define a gap 38 which preferably is centered on the source 31 and receives radiation 31'. Top reflector 33 and bottom reflector 32 form a waveguide 40 for propagating the X-ray radiation 31' to the sample 35 which is positioned over the detector 36, as described above.

The reflector surfaces 32a and 33a are not expected to be perfectly planar, so the width of the gap 38 varies over the lengths of the reflectors in the direction of signal propagation. The distance d is very small, and the variance is not more than few microns; therefore, the entering radiation beam 31' will fall onto the surfaces 32a and 33a of the reflectors with angles less than the critical angle. The width of the gap 38 or distance d may be varied with gaskets, support shims, micro screws, or the like for sizing of the waveguide.

Figure 4:
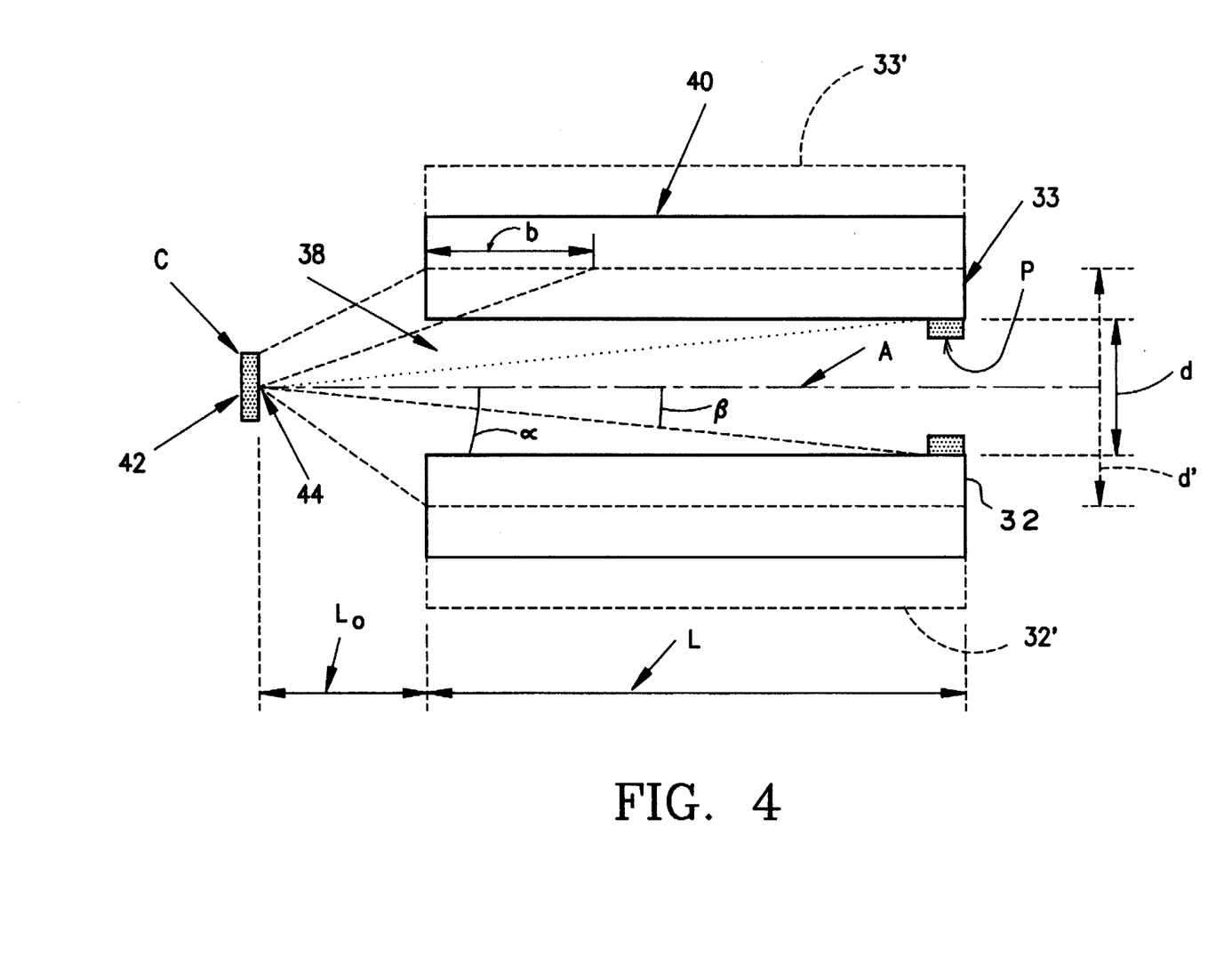
FIG. 4 illustrates a sectional view of the simplest form for a waveguide.

Sizing is a function of the relationships between requirements for a total reflection condition, the width of a channel (or gap) and its length. The example used to explain these relationships is for the simplest embodiment with planar reflectors, but the methods discussed here can be generalized for other shapes. Turning now to FIG. 4, an example of optimization is illustrated. The waveguide 40 has a length L and is separated from an X-ray source focal plane 42 by a distance $L_0$. As an aside, the length L for the first embodiment of FIG. 3 is the diameter of reflectors 32, 33. The width d of the waveguide channel (or the width of the gap 38) is selected to meet following conditions: radiation from a point source 44 on a central axis A of the waveguide must fall on the gap 38 at an angle $\alpha$ which is less than a critical angle of total reflection for selected wavelengths. In this case all radiation will be transmitted through the waveguide to the probe P on its exit end. The reflectors can be moved further apart as is shown at 32'-33' in FIG. 4, and an increased separation distance d' shown for the new position of reflectors 32 and 33 increases an unusable part b of the waveguide. Part b is unusable because the radiation from source 42 falls upon the reflectors at an angle which is more than the critical angle so that the radiation is absorbed in the reflector walls. Thus, as an example, for a Mo $K_\alpha$ line (17.476 keV) it is known that the value of the critical angle is 5.9 arc minute ($\approx 0.00172$ rad). For a distance $L_0 \approx 2$ mm, the spacing d required for reflection of the $M_0K_a$ line is calculated as $d \approx 2*L_0* \alpha$, which yields an approximate value for d of 0.0007 mm (7μ). For longer wavelengths (and less energy) this value d may be larger, because the critical angle α depends on tile wavelength $\lambda$ (or energy E) as a square of the wave length, $\alpha \sim \lambda^2$ (or $\sim 1/E^2$).

For all non-axial points of longitudinal focus, such as points 46 on focal plane 42, the entrance angle into the waveguide 40 of the radiation is less than the angle for the axial point 44, so the width d of the channel 38 may be increased (dashed rectangle) for radiation from these points to provide a more efficient collection of radiation. The result of these differing requirements for d, the optimum width of the waveguide channel may be selected from a range of 1–20 μm depending on the wavelength of the source. The width may also be varied as a function of the material of the anode target, since that material affects the source radiation.

The length L of the waveguide and the material of the waveguide body are selected as follows:

a) The ratio between the angle of the probe from the focus point (β is a planar section of it) to the angle of the waveguide entrance (α is a planar section of it) must satisfy the following condition:

$$L_0^2 / (L + L_0)^2 \ll 1$$

b) The absorption of the incident beam 31' of X-rays from the source must be significantly attenuated in the waveguide material. Thus the length of the waveguide can be shorter if it is made with heavy glass rather than with quartz since glass attenuates more than quartz.

It is preferable to make the waveguide relatively short, because the fraction of the radiation at its exit end after N reflections is $R^N$, where R is the reflection coefficient which has a value that is less than one. When N>>1 the losses in the X-ray excitation beam may be significantly high. It has been found that the optimum length of the channel is selected from a range of 30–60 mm and in practical applications should be adjustable for different wavelengths. The length is also adjusted for the material of the anode target. The best results in sizing may be obtained with computer modeling of X-ray propagation through the waveguide with a Monte-Carlo simulation method or through direct experimentation.

The reflector plates 32, 33 may made from any appropriate material such as glass, quartz or the like. The quality requirements for these reflector plates are that their surface micro roughness should not exceed 0.05μ, and their macro roughness (deviations from the plane) should not exceed a few microns. In order for the reflectors to function as a waveguide, however, they must be continuous from the entrance or gap to the probe holder.

A fine focus X-ray tube may be used as a primary radiation beam source. The X-ray tube may focus upon a point or in a line or it may focus in a two dimensional shape at an imaginary plane. Some X-ray tubes focus in a two dimensional shape having a major axis and a minor axis. To ensure that the maximum intensity of the primary radiation beam falls on the entrance of the waveguide 40, the larger linear dimension (or major axis) of the focus spot, in the preferred embodiment of the invention, will be parallel to the plane of reflectors 32 and 33 and positioned between them. The X-ray optics preferably are compact; thus the distance between $L_0$ the tube's exit window and to the waveguide channel 38 entrance should be approximately 1–2 mm. Because of the very close geometry in this embodiment nearly the whole radiation stream for which TR conditions are met is used. Since the relative brightness of each point on the anode is weakly related to the tube's power and since the area of the anode really used is practically equal to the area restricted by diaphragms for high power X-ray tubes in conventional systems, the invention works with tubes requiring under 10 W of power.

An additional benefit which arises from the waveguide of the present invention is that it avoids the weakening of the radiation which would occur in free space due to spherical propagation. With the structure of the present invention, X-ray tubes may have several anodes or several targets on one anode. These targets may be switched and adjusted as needed. The switching, positioning and adjusting of the electron beam within the tube, for example onto a selected one of several targets, may be accomplished with a magnetic field, as in the well known deviation systems used in cathode ray tubes. Such magnetic fields can easily control the tube with changing of the current through a solenoid.

FIGS. 3a–3c illustrate that in use, radiation from anode target 42 of X-ray tube 31 irradiates the gap 38 of waveguide 40. Beams of primary, or incident, radiation 31' which satisfy the conditions of total reflection are propagated at 48 within the waveguide 40. The radiation which impinges on the sample 35 causes the sample to yield fluorescence 50, and the detector 36 collects this yield fluorescence through the corresponding aperture 34 in the reflector body 32. As illustrated in FIG. 3c, the positioning of the samples and corresponding aperture insures that the path of the incident X-ray beam 48, from the X-ray tube's anode 42 to the probe or sample 35, is not interrupted by another hole or probe. For a maximum use of the X-ray tube's output, the tube's anode is coaxial with the center axis A of the channel 38 between reflectors. This position should be optimized for effective and efficient coupling of the X-ray tube output to the waveguide.

The closeness between the reflectors, once they are shimmed, enhances the mechanical stability of both of the reflectors 32, 33. Once the waveguide with its unitary probe holder has been properly manufactured, no additional precision position adjustment is needed for the spacing of the reflectors or the position of the probe as in the prior art. Maximum brightness of the X-ray tube anode may be established through relative adjustment of the focus spot with respect to the waveguide entrance. Thus, for example, the tube can be manually repositioned as required to obtain maximum intensity of the X-ray beam in the waveguide.

As shown in FIG. 3b, the greatest part of the path of the incident excitation radiation is within the waveguide and the excitation beam reaches the probe without passing through areas where it would be weakened, as is typical for a spherical wave which propagates from one reflector to a second one which is separated by a free space discontinuity. Put another way, since the excitation beam is bounded on two sides for the entire continuous length of the waveguide, rather than reflecting from widely separated reflectors, as in the prior art, the beam's energy is more contained and more of that energy is delivered to the probe. The structure of the present invention is called a waveguide because it is continuous. The only weakening of the wave is due to the reflection coefficient for multiple total reflection, which is less than 1.

The advantageous geometry of the carousel waveguide 40 permits use of the single reflector 33 as a multi-sample holder and provides a convenient way change samples which can be positioned five at a time and queued up for analysis. Changing the sample to be analyzed is accomplished by rotation the waveguide 40 around the central axis 37.

Figure 5A:
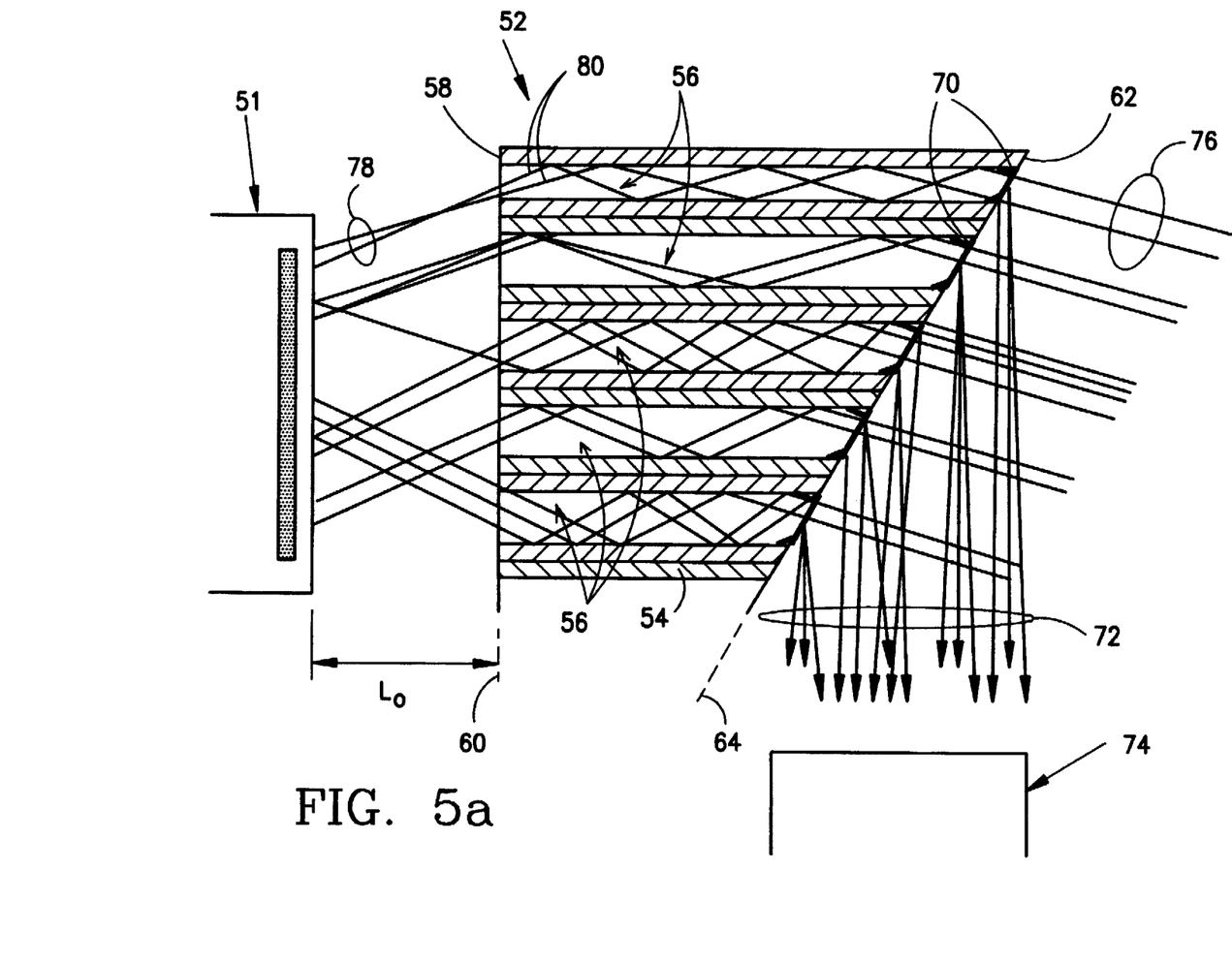
FIG. 5a illustrates a front elevation view of a second embodiment of the present invention where a waveguide is made up of a bundle of thin capillary tubes tightly nestled together.
Figure 5B:
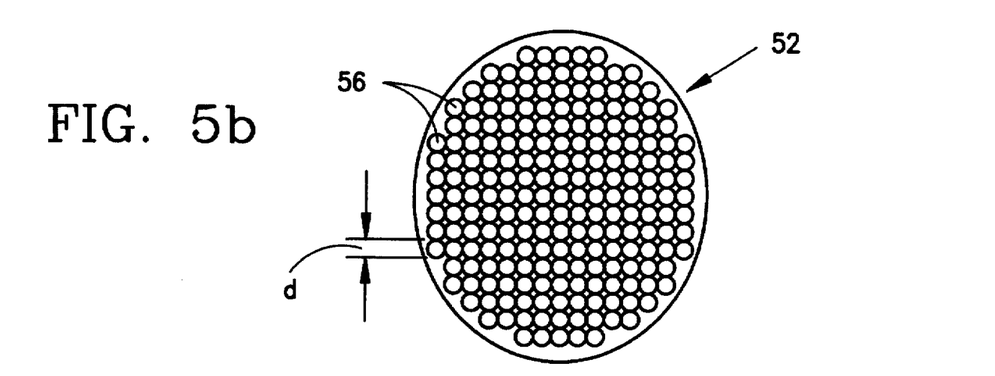
FIG. 5b illustrates a side elevation view of the second embodiment.

FIG. 5 illustrates a second embodiment of the invention. This embodiment also includes an X-ray tube 51 as a source of incident excitation radiation which is directed into a waveguide 52. The waveguide is made up of a bundle of thin polished glass, quartz or metal capillary tubes 54 which are tightly nestled together. The interior of each tube is defined as a tubular cavity 56. One end of each tube is positioned facing the X-ray tube; this end is the entrance end for X-rays. At the entrance ends, the tubes are cut to length in a plane 60 perpendicular to their central axis. At the opposite ends 62 of the tubes, which are the waveguide exits for X-rays; the tubes are cut at an angle to their central axes of about 30°, as shown in FIG. 5a or may be some other selected angle. More generally, the opposite ends 62, which are the sample ends, are terminated in a second plane 64 which is not perpendicular to the central axis of the tubes, and forms, at the sample end of the bundle of tubes, an angled waveguide face which is the sample holding surface.

The relationships between the requirement for a total reflection condition, the diameter of each capillary tube and its length are similar to those defined above for the planar example.

Thus, the diameter of a waveguide tubular cavity is analogous to the channel width d, as shown in FIG. 4. The diameter of the capillary cavity is selected to meet the following conditions: radiation from a point source on the central axis of the tubular cavity must fall on the entrance to that tube at the angle α (as shown in FIG. 4), and this angle must be less than the critical angle of total reflection for the different wavelengths in the X-ray beam. Here again, as the result of the compromise between the opposing requirements the optimum diameter of a tubular cavity is selected from a range of 1 to 20 μm and can be practically adjusted for different wavelengths.

The length L of each capillary L and the material of body are selected as follows:

a) The ratio between the angle of the probe from the focus point (β is a planar section of it) to the angle of each capillary waveguide entrance (α-is a planar section of it) must satisfy the condition $$L_0^2 / (L + L_0)^2 \ll 1$$

b) The absorption of the primary beam of the X-ray source must be attenuated in the capillary waveguide material. Here again, the length of the waveguide will be shorter if it is made with heavy glass than with quartz since glass is more lossy than quartz.

On the other hand, the waveguide must not be excessively long, because the fraction of the radiation at the exit end where the probes are 54, after N reflections is $R^N$, where R is the reflection coefficient (R<1).

When N>>1 the losses of excitation beam may be significantly high. So as the result of a compromise between these opposing requirements, the optimum length of the capillary channel is selected from range 30–60 mm and is adjusted for different wavelengths. Here again, the best results in optimization may be obtained with computer modeling of X-ray propagation through the capillary.

In a variation on this embodiment, a micro channel plate with the same cutting planes as above may be used instead of the bundle of capillary tubes. Micro channel plates are standard pieces which are widely used as a part of a registration system in high precision optics instead of photomultipliers, (see, e.g. Wiza, J. L., *Nuclear Instruments and Methods* 1979, v.162, p.587–601). Conceptually, the microchannel plate embodiment is like the bundle of capillary tubes but with the cavity between the walls of every capillary absent. The micro channel plate has a capillary cavity in solid state and the geometry of the capillary is the same as that shown in FIG. 5.

Samples or probes 70 may be affixed to the exit end of the waveguide within each cavity 56. Once irradiated with a TR X-ray beam, the samples will emit a yield fluorescence 72 which is sensed by a fluorescence detector 74. The detector is advantageously positioned to attenuate reception of the excitation X-ray radiation, such as X-ray exit beams 76 which have propagated through the waveguide.

Unlike the first embodiment, the waveguide of the second embodiment can collect the radiation from practically the whole surface of the long anode of the X-ray tube. This is possible because, for each segment of the anode, there is at least one tube positioned such that the incident excitation radiation has an angle of incidence which is less than the critical angle.

In use, radiation from the anode target of X-ray tube 51 irradiates the entrance end of the waveguide. Incident beams of radiation 78 which satisfy the conditions of total reflection (TR) propagate at 80 within the waveguide through the tubular cavities 56 to the sample 70 and cause the yield X-ray fluorescence 72 which is collected by detector 74. The tubular cavities (or the micro channels in the micro channel plate) each behave as a waveguide. As discussed above, the diameter of each tubular cavity 56 is chosen to achieve TR propagation, in a manner analogous to the spacing between the surfaces of the reflectors 32 and 33 in FIGS. 3a–3c.

The substance 70 being analyzed is placed on the exit surface of the waveguide in FIG. 5a and dried. The excitation radiation reaches the probe after (and only after) multiple TR; it excites the atoms in the probe or sample and then exits as X-ray radiation 76. The exit beam is practically parallel to the unit's axis, because the range of TR angles is extremely small, although the angles illustrated in FIG. 5a ae exaggerated for purposes of illustration. Fluorescent radiation from the probe's atoms is gathered at a different angle with the unit's axis. Despite the fact that the sample material is thin, the absolute amount of substance analyzed is relatively large, because of the large size of the waveguide exit surfaces. FIG. 5b shows an end view of the bundle of capillaries.

Figure 6:
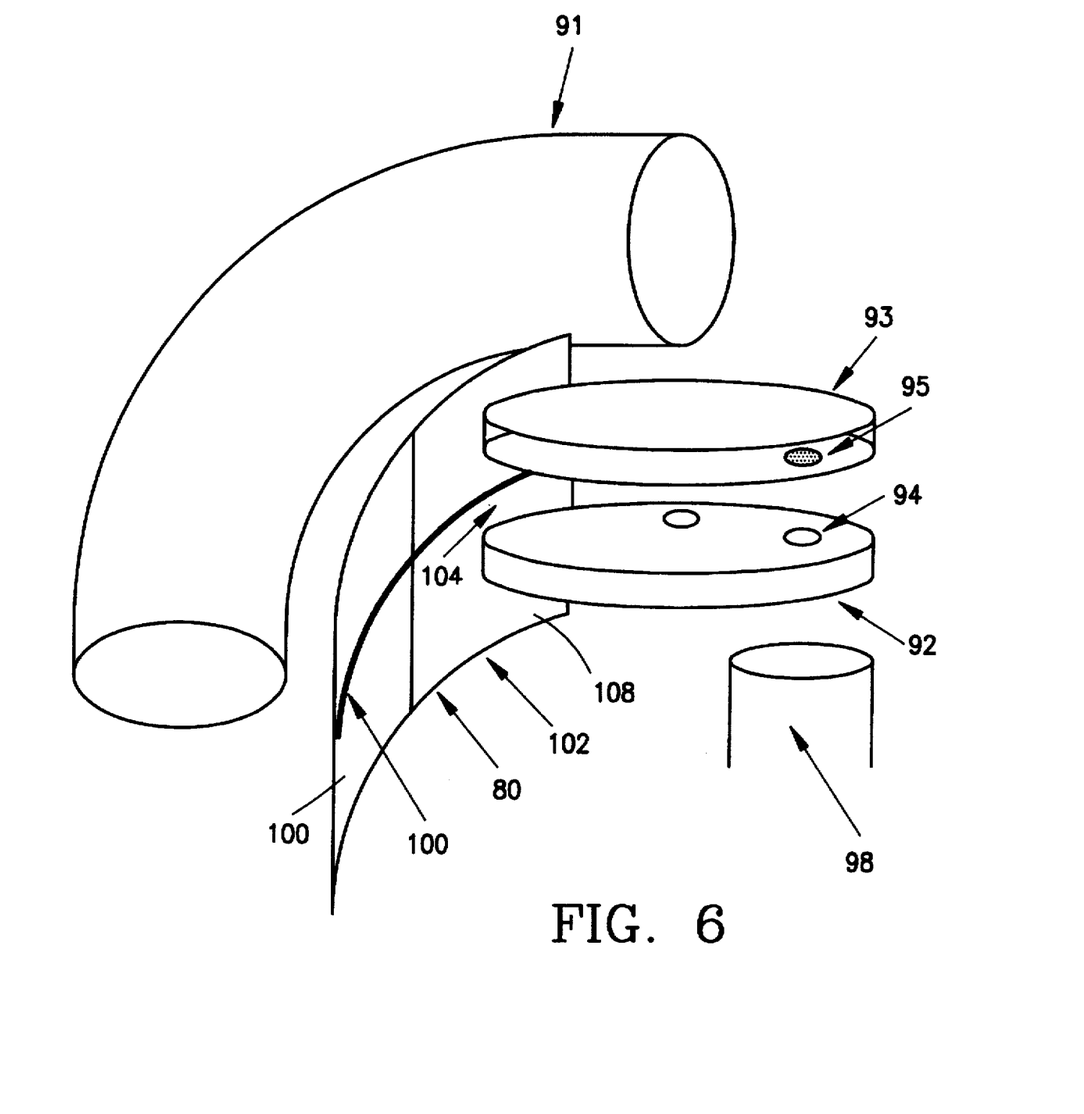
FIG. 6 illustrates a third embodiment of the invention where a fine focus X-ray tube with a ring anode is used as a radiation source.

The third embodiment of the invention, illustrated in FIG. 6 includes a toroidal X-ray tube 91, a planar lower reflector 92, a planar upper reflector 93, apertures 94 in the lower reflector, and corresponding sample sites or probes 95 on the upper reflector. The upper reflector and lower reflector together form a waveguide 96, as described above with respect to FIGS. 3a–3c. A detector 98 is used to gather yield fluorescence radiation from the probe.

The toroidal X-ray tube 91, only a section of which is illustrated in FIG. 6, radiates X-rays inwardly toward the waveguide 96. The tube, though toroidal, may radiate from one point along the torus, or may radiate along a fine focus ring or arc, 100, on a circular anode 102, thus radiating along part or all of a circle which defines the interior focal line of the toroidal tube. Circular anode 102 is also represented in FIG. 6 by a section of the circle.

The tube 91 surrounds the waveguide 96 and is in close proximity to outer perimeter of the waveguide. The X-ray emitting line 100 of the X-ray tube anode target 102 is parallel to the plane of entrance slot 104 of the waveguide 96 and is situated to propagate incident radiation into the slot with a minimum of wasted energy. With this configuration, the waveguide is situated inside the tube's body, i.e. within the hole in the torus. Anode target materials may vary along the anode's length so that there can be different materials in different parts 106, 108 of the X-ray emitting line along the X-ray tube anode. Each of the various anode materials may have distinct characteristic spectral lines, (together or separately) in order to optimize excitement of the probe. Because of the longer length of the tube's circular anode, the relative power dispersed per unit of anode length is small so that any increase in the total power of the X-ray tube 91 leads to a substantial increase in the entrance radiation beam density as compared to prior art configurations. As an example, when the width of the circular tube's focus line is 0.1 mm and the ring's diameter is 60 mm, the circular waveguide collects practically all radiation from a total anode area of 18.8 mm². The increased radiation density of this embodiment of the invention is not attainable with a tube having a linear focus and similar anode area.

Figure 7:
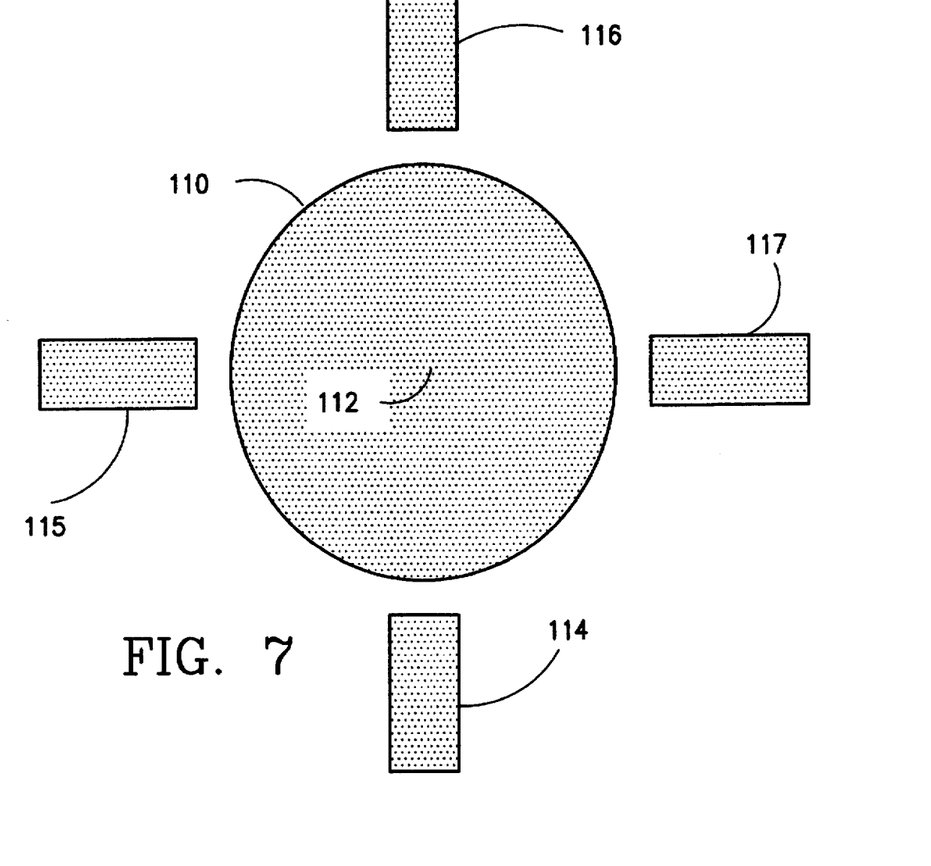
FIG. 7 illustrates a forth embodiment of the invention where many fine focus X-ray tubes are used as a radiation source.

The fourth embodiment of this invention is shown on FIG. 7. This embodiment uses the same waveguide as described for the third embodiment of FIG. 6, the waveguide being illustrated in plan view as 110. This waveguide is comprised of a top reflector 112 and a bottom reflector (not shown) which are placed in close proximity with a plurality of fine focus X-ray tubes 114–117. An even number of tubes should be used in conjunction with an odd number of sample holders and apertures in waveguide 110.

This embodiment differs from the third embodiment of FIG. 6 in that a plurality fine focus X-ray tubes 92 are used as a radiation source instead of a toroidal X-ray tube. Both of these embodiments are feasible because of the axial symmetry and the compactness of the waveguide of the present invention. The third embodiment represents the upper limit of the forth embodiment; thus, if an infinite number of infinitesimal fine focus tubes 114–117 were juxtaposed along a circle, the fourth embodiment would be converted into the third embodiment, with the toroidal X-ray tube.

X-ray tubes 114–117 may be chosen on a mix-and-match basis to optimize the fluorescent yield signal for a particular sample. This is analogous to the selection of differing anode materials chosen for the same purpose as described for the embodiment of FIG. 6.

Figure 8:
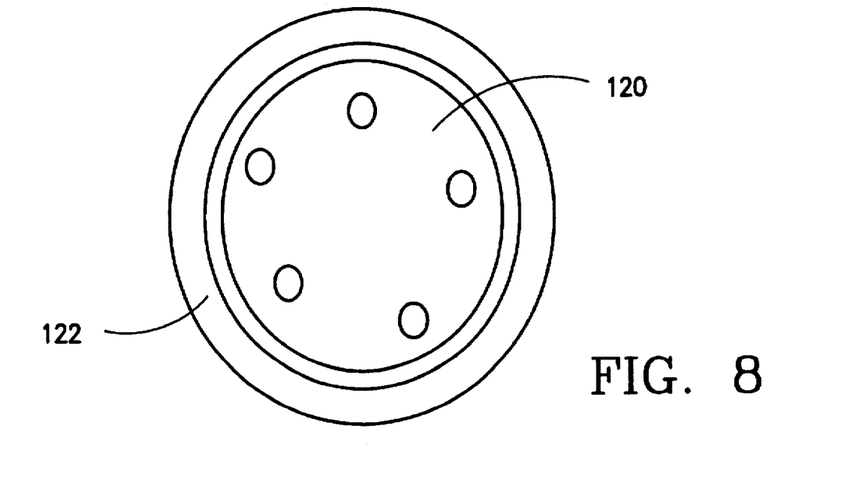
FIG. 8 illustrates a fifth embodiment of the invention where a circular radionuclide source is used as a radiation source.

A fifth embodiment of this invention is illustrated in FIG. 8. This is an adaptation of the third embodiment and employs a waveguide 120 which has the same configuration of top reflector and bottom reflector. However, this embodiment includes a radionuclide source 122 in close proximity to the waveguide and situated to propagate energy into the waveguide.

A radionuclide source is a radioisotope source. This source includes a radioactive substance which is placed on the surface of a holder. The radioactive matter usually is covered with a protective shell. Such sources are sometimes used in portable devices. See ,e.g. *TN Technology, SPECTRACE* 9000. The axial symmetry of the waveguide 101 is advantageously employed here because the intensity of radiation from the nuclide source is sufficient for the TR analysis, since the radiation stream comes to the probe from every direction.

The EDXF-TR described above may easily be transformed into a traditional EDXF scheme analyzer by simply removing the waveguide and, if necessary, adjusting the X-ray tube position in accordance with the traditional scheme. A method for converting the present EDXF TR X-ray fluoroscopy analyzer for use on a bulk material sample would include the following steps: removing the X-ray waveguide with its integral sample holder from the instrument; directing an X-ray excitation beam onto the bulk material sample; and irradiating the bulk material sample with the beam, so that the bulk material sample will emit a fluorescent yield signal; and detecting the fluorescent yield signal. This transformation is made possible by the waveguide's compactness and the simplicity and permanence with which it may be adjusted and is not possible with the prior art EDXF TR systems.

Figure 9:
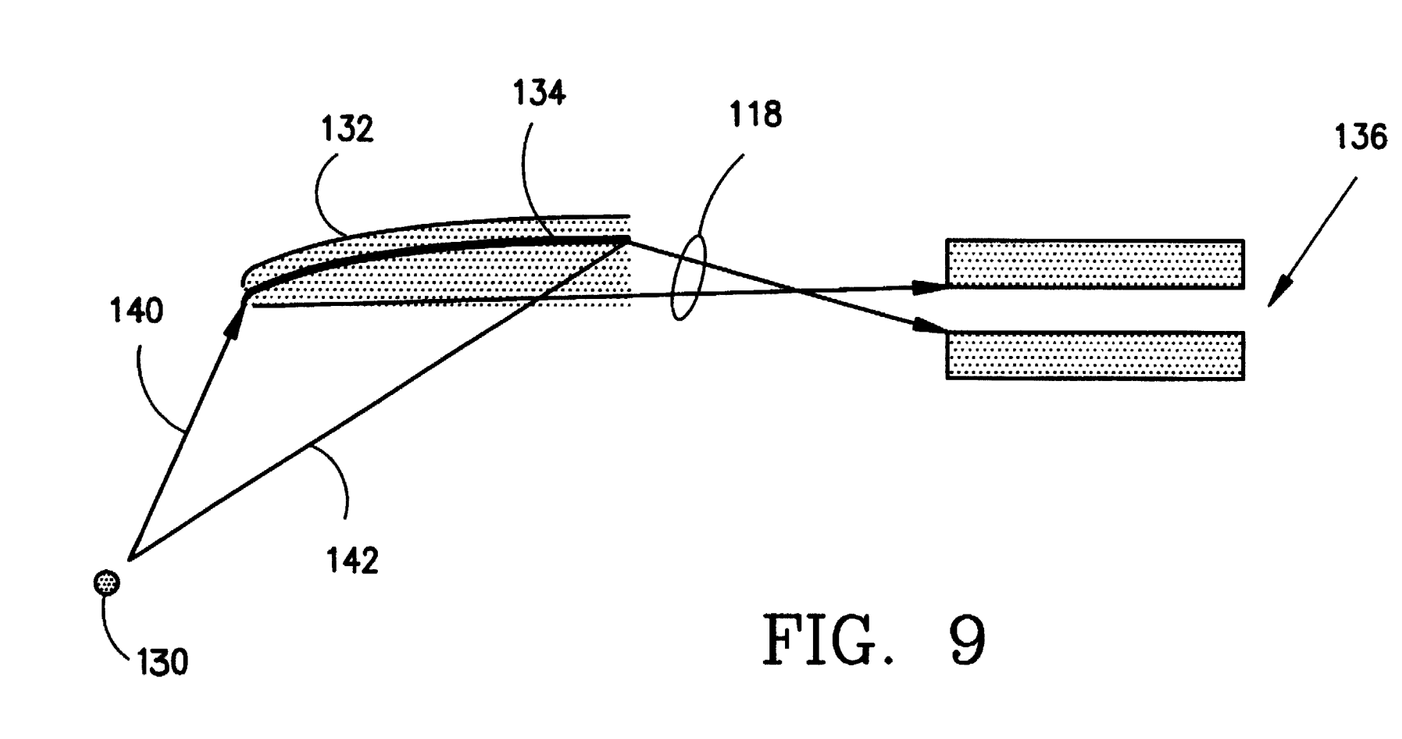
FIG. 9 illustrates a sixth embodiment of the invention where an X-ray tube with a specific monochromator is used as a radiation source.

A sixth embodiment of this invention is shown on FIG. 9. It includes an X-ray tube 130, a curved reflector 132, a monochromator 134 which may be comprised of a multi-layer coating, and a waveguide 124 comprised of planar reflectors. In this embodiment, the monochromator acts as a filter for decreasing the background level in the detected signal due to the scattering of the excitation radiation from the X-ray tube. The X-ray tube 130 is used with a specific monochromator 134 to provide X-ray excitation radiation 138 with a chosen wavelength.

The monochromator 134 is a thin multilayer covering which is curved as a part of a logarithmic spiral. Monochromatic radiation, which is the result of Bragg interference from the multilayer coating 134, is possible for angles of incidence of about 1 degree. The largest divergence of X-ray excitation beams 140, 142 from source 130 is found from the range of values of required energy resolution for the monochromator, and is about 0.01 degree. These conditions are met if the range of total reflection angles is not more 10 minutes of angle. The logarithmic spiral reflector, in polar coordinates (r, φ), has the form $r = r_0 \cdot \exp(\phi \cdot \operatorname{ctg}(\theta))$, where r and $r_0$ are the radial coordinates of the origin and the current points of the curve, respectively. φ is an angle coordinate of a current point, and this is angle within (a) a line which connected at one end to the origin of the pole coordinate and at the other end a current point, and (b) a tangent line to the spiral. The angle is constant for all points of the spiral, which is why all X-ray beams emitted from the pole and incident on the curved reflector are at the same angle. That is also why the Bragg conditions are satisfied for all the incident X-ray beams. The angle width of the excitation beam of radiation is determined only with the angle aperture of the curved reflector and, therefore, is greater than for a planar reflector. The angle, approximately 1 degree, between the waveguide axis and the reflector 132, allows total reflection conditions. The waveguides described above can be used with this monochromator.

The forgoing describes the preferred embodiments of the present invention along with a number of possible alternatives. A person of ordinary skill in the art will recognize that modifications of the described embodiments may be made without departing from the true spirit and scope of the invention. The invention is therefore not restricted to the embodiments disclosed above, but is defined in the following claims.

We claim:

1. An apparatus for trace element x-ray fluorescence analysis of a sample of a substance, comprising:

an X-ray source for generating an X-ray excitation beam;

an X-ray waveguide having an entrance and a sample holding surface which is opposite said entrance and separated therefrom by a fixed length, said waveguide having cross-sectional dimensions which will propagate said X-ray excitation beam from the source through the entrance and to the sample only after total reflection of the X-ray excitation beam;

wherein the sample of the substance, situated upon said sample holding surface, is irradiated with said X-ray excitation beam at a grazing angle of incidence which is less than a critical angle for total reflection; and a detector for receiving fluorescence radiation from said sample, said detector being positioned to receive the fluorescent radiation from the sample and attenuate reception of the excitation X-ray radiation.

2. The apparatus of claim 1, wherein said waveguide comprises:

first and second planar reflectors, situated in parallel and facing one another to define a waveguide interior;

each reflector having a polished surface which faces said waveguide interior thus defining first and second interior surfaces of the waveguide; and Said first and second interior surfaces being separated by a chosen distance, wherein the chosen distance will permit propagation of X-rays from the source through the entrance and to the sample only after total reflection of the X-rays.

3. The apparatus of claim 2, wherein said chosen distance is selectably adjustable.

4. The apparatus of claim 3, wherein said chosen distance is selectably adjustable by adjustment of micro-screws.

5. The apparatus of claim 3, wherein said chosen distance is selectably adjustable by adjustment of support shims.

6. The apparatus of claim 3, wherein said chosen distance is selectably adjustable by adjustment of gaskets.

7. The apparatus of claim 1, wherein the said waveguide comprises a plurality of tubes, said tubes having an entrance end and a sample holding end, an internal cavity diameter, and a central axis;

wherein said tubes are bundled together in close proximity to one another and having the central axes of said tubes parallel to one another;

wherein the internal cavity diameter will permit propagation of X-rays from the source through the entrance and to the sample only after total reflection of the X-rays;

wherein the entrance end of said tubes are each terminated in a first plane which is perpendicular to the central axes of the tubes thereby forming said waveguide entrance; and wherein said sample end is terminated in a second plane which is not perpendicular to the central axis of the tubes, thereby forming, at the sample end of the bundle of tubes, an angled waveguide face thereby forming said sample holding surface.

8. The apparatus of claim 7, wherein said tubes are fabricated from quartz.

9. The apparatus of claim 7, wherein said tubes are fabricated from glass.

10. The apparatus of claim 7, wherein said tubes are fabricated from metal.

11. The apparatus of claim 7, wherein said tubes terminated at said sample end in a plane which is at a 45 degree angle with respect to the central axes of the tubes.

12. The apparatus of claim 2, wherein said first reflector is circular, has an outside edge which defines a first radius and includes three sample holding surfaces, said sample holding surfaces being situated on said first interior surface and equally spaced upon the first interior surface at a second radius which is less than the first radius;

wherein said second reflector is circular, has an outside edge which is at said first radius and includes three apertures, said apertures being situated on said second interior surface and equally spaced about the second reflector at said second radius; and Wherein said first and second circular reflectors are situated along a common axis.

13. The apparatus of claim 12 wherein said X-ray source is a toroidal X-ray tube with ring focus, including a ring shaped anode target.

14. The apparatus of claim 13 wherein said anode is fabricated from a first material and a second material.

15. The apparatus of claim 12 wherein said X-ray source comprises a plurality of X-ray tubes, wherein said tubes are equally spaced about the outside edge of the waveguide.

16. The apparatus of claim 12 wherein said X-ray source is a circular radionuclide.

17. The apparatus of claim 1 wherein the said X-ray source is a X-ray tube with a monochromator.

18. The apparatus of claim 17 wherein said monochromator is a X-ray reflector with a multi-layer coating on a reflecting surface, and said reflector is curved in a logarithmic spiral.

19. A method of X-ray fluoroscopy, comprising:

placing a thin sample of a substance to be analyzed for trace elements upon a sample holder which is integrally fabricated into a X-ray waveguide having an entrance end and a sample holding end;

directing an X-ray excitation beam into said waveguide through said entrance end whereby said beam will propagate through the waveguide by total reflection;

irradiating said thin sample with the propagated beam at an angle of incidence which is less than the critical angle for total reflection, whereby said sample will emit a fluorescent yield signal; and detecting said fluorescent yield signal.

20. A method for converting an analytical instrument for EDXF-TR X-ray fluoroscopy into an instrument for use on a bulk material sample, comprising:

removing a sample holder which is integrally fabricated into a X-ray waveguide having an entrance end and a sample holding end from the instrument;

directing an X-ray excitation beam onto the bulk material sample;

irradiating the bulk material sample with said beam, whereby said bulk material sample will emit a fluorescent yield signal; and detecting said fluorescent yield signal.

* * * * *